US009810764B2

(12) United States Patent
Shaw et al.

(10) Patent No.: US 9,810,764 B2
(45) Date of Patent: Nov. 7, 2017

(54) SYSTEMS AND METHODS FOR HIGH PRECISION INDOOR LOCATION TRACKING

(71) Applicant: AT&T Intellectual Property I, LP, Atlanta, GA (US)

(72) Inventors: Venson Shaw, Kirkland, WA (US); Jin He, Fremont, CA (US)

(73) Assignee: AT&T Intellectual Preoperty I, L.P., Atlanta, GA (US)

( * ) Notice: Subject to any disclaimer, the term of this patent is extended or adjusted under 35 U.S.C. 154(b) by 948 days.

(21) Appl. No.: 14/041,981

(22) Filed: Sep. 30, 2013

(65) Prior Publication Data

US 2015/0091757 A1    Apr. 2, 2015

(51) Int. Cl.
*G01S 3/02*        (2006.01)
*G01S 5/04*        (2006.01)
*G01S 5/06*        (2006.01)
*H04W 64/00*       (2009.01)
*H01Q 1/00*        (2006.01)
*G01S 5/02*        (2010.01)

(52) U.S. Cl.
CPC .................. *G01S 5/04* (2013.01); *G01S 5/06* (2013.01); *H04W 64/006* (2013.01); *G01S 5/02* (2013.01); *H01Q 1/007* (2013.01)

(58) Field of Classification Search
CPC ............. G01S 5/04; G01S 5/06; H01Q 1/007; H04W 64/006
USPC ......................................... 342/385, 450, 458
See application file for complete search history.

(56) References Cited

U.S. PATENT DOCUMENTS

| | | | | |
|---|---|---|---|---|
| 6,421,009 B2* | 7/2002 | Suprunov | .............. | H01Q 21/06 |
| | | | | 342/457 |
| 6,697,628 B1* | 2/2004 | Green | ....................... | G01S 5/10 |
| | | | | 342/357.32 |
| 7,800,541 B2* | 9/2010 | Moshfeghi | ................ | G01S 5/14 |
| | | | | 342/422 |
| 8,254,951 B2* | 8/2012 | Gill | .......................... | G01S 5/02 |
| | | | | 455/41.2 |
| 8,331,953 B2* | 12/2012 | Carlson | ..................... | G01S 5/12 |
| | | | | 455/456.1 |
| 8,350,758 B1 | 1/2013 | Parvizi et al. | | |
| 8,400,292 B2 | 3/2013 | Kummetz | | |
| 8,457,657 B2* | 6/2013 | Aggarwal | ............. | H04W 60/00 |
| | | | | 455/456.2 |

(Continued)

OTHER PUBLICATIONS

Hassan et al, "An Indoor 3D Location Tracking System using RSSI", 2010 Sixth International Conference on Signal-Image Technology and Internet Based Systems, Dec. 2010, pp. 323-328.

(Continued)

*Primary Examiner* — Chuong P Nguyen
(74) *Attorney, Agent, or Firm* — Baker & Hostetler LLP

(57) ABSTRACT

A radio frequency signal mediator configured indoors passively receives signals from a user wireless device and determines layer two radio access network measurement data from the signals. At least one other radio frequency signal mediator in the same space also passively receives signals from the user wireless device and determines layer two radio access network measurement data from the signals. The radio frequency signal mediators send the data to a location determining device that determines a location for the user device based on the at least two sets of data and send the location data to a location server.

20 Claims, 11 Drawing Sheets

(56) References Cited

U.S. PATENT DOCUMENTS

| | | | |
|---|---|---|---|
| 9,002,373 B2* | 4/2015 | Marti | G01S 5/0242 |
| | | | 370/328 |
| 9,226,166 B2* | 12/2015 | Kurz | G01S 5/0289 |
| 9,404,997 B2* | 8/2016 | Amizur | G01S 5/14 |
| 2008/0026733 A1* | 1/2008 | Jaatinen | G01S 5/02 |
| | | | 455/414.2 |
| 2010/0271263 A1* | 10/2010 | Moshfeghi | G01S 5/0263 |
| | | | 342/378 |
| 2011/0069627 A1* | 3/2011 | Sridhara | G01S 11/06 |
| | | | 370/252 |
| 2011/0081919 A1 | 4/2011 | Das et al. | |
| 2011/0188389 A1 | 8/2011 | Hedley et al. | |
| 2011/0287801 A1* | 11/2011 | Levin | H04B 17/391 |
| | | | 455/517 |
| 2012/0029817 A1 | 2/2012 | Khorashadi et al. | |
| 2012/0095678 A1 | 4/2012 | Moore et al. | |
| 2012/0191512 A1 | 7/2012 | Wuoti et al. | |
| 2013/0029686 A1 | 1/2013 | Moshfeghi | |
| 2013/0109405 A1 | 5/2013 | Siomina et al. | |
| 2013/0143595 A1 | 6/2013 | Moshfeghi | |
| 2013/0203437 A1* | 8/2013 | Whelan | G01S 19/05 |
| | | | 455/456.1 |
| 2014/0233624 A1* | 8/2014 | Pon | H04L 43/0864 |
| | | | 375/226 |
| 2016/0309303 A1* | 10/2016 | Svener | H04W 4/04 |

OTHER PUBLICATIONS

Hoflinger et al, "Acoustic Self-calibrating System for Indoor Smartphone Tracking (ASSIST)", 2012 International Conference on Indoor Positioning and Indoor Navigation (IPIN), Nov. 13-15, 2012, pp. 1-9.

Lin et al, "Performance Comparison of Indoor Positioning Techniques based on Location Fingerprinting in Wireless Networks", 2005 International Conference on Wireless Networks, Communications and Mobile Computing, Jun. 2005, 2, pp. 1569-1574.

Malekpour et al, "Location Determination Using Radio Frequency RSSI and Deterministic Algorithm", $6^{th}$ Annual Communication Networks and Services Research Conference, 2008. May 2008, pp. 488-495.

Wann et al, "Hybrid TDOA/AOA Indoor Positioning and Tracking Using Extended Kalman Filters", Vehicular Technology Conference, 2006. VTC 2006-Spring. IEEE $63^{rd}$. May 2006, 3, pp. 1058-1062.

* cited by examiner

SYSTEMS AND METHODS FOR HIGH PRECISION INDOOR LOCATION TRACKING

TECHNICAL FIELD

The technical field generally relates to wireless communications and more specifically relates to location tracking in long term evolution (LTE) networks.

BACKGROUND

In wireless networks, such as long term evolution (LTE) networks, the location of user device is tracked for various reasons, such as providing location-based services and determining the location of a user who placed an emergency call. Because current location tracking technology relies on global positioning system (GPS) technology to determine device location data, location information may be difficult or impossible to determine for a device that is not outdoors or is otherwise unable to detect signals from GPS satellites. When a device is not able to detect GPS satellite signals, a service provider may not be able to determine a device's precise location, even if the device is in communication with a base station. Other technologies, such as triangulation, can be used to estimate a location, but not with the precision provided by GPS technology.

SUMMARY

A radio frequency signal mediator configured indoors may passively receive signals from a user wireless device and determine layer two radio access network measurement data from the signals. At least one other radio frequency signal mediator in the same space may also passively receive signals from the user wireless device and determine layer two radio access network measurement data from the signals. The radio frequency signal mediators may send the data to a location determining device that determines a location for the user device based on the at least two sets of data and send the location data to a location server. The location server may use this location data to provide a precise location to a user indoors for purposes of emergency response, targeted marketing, and improved customer information. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
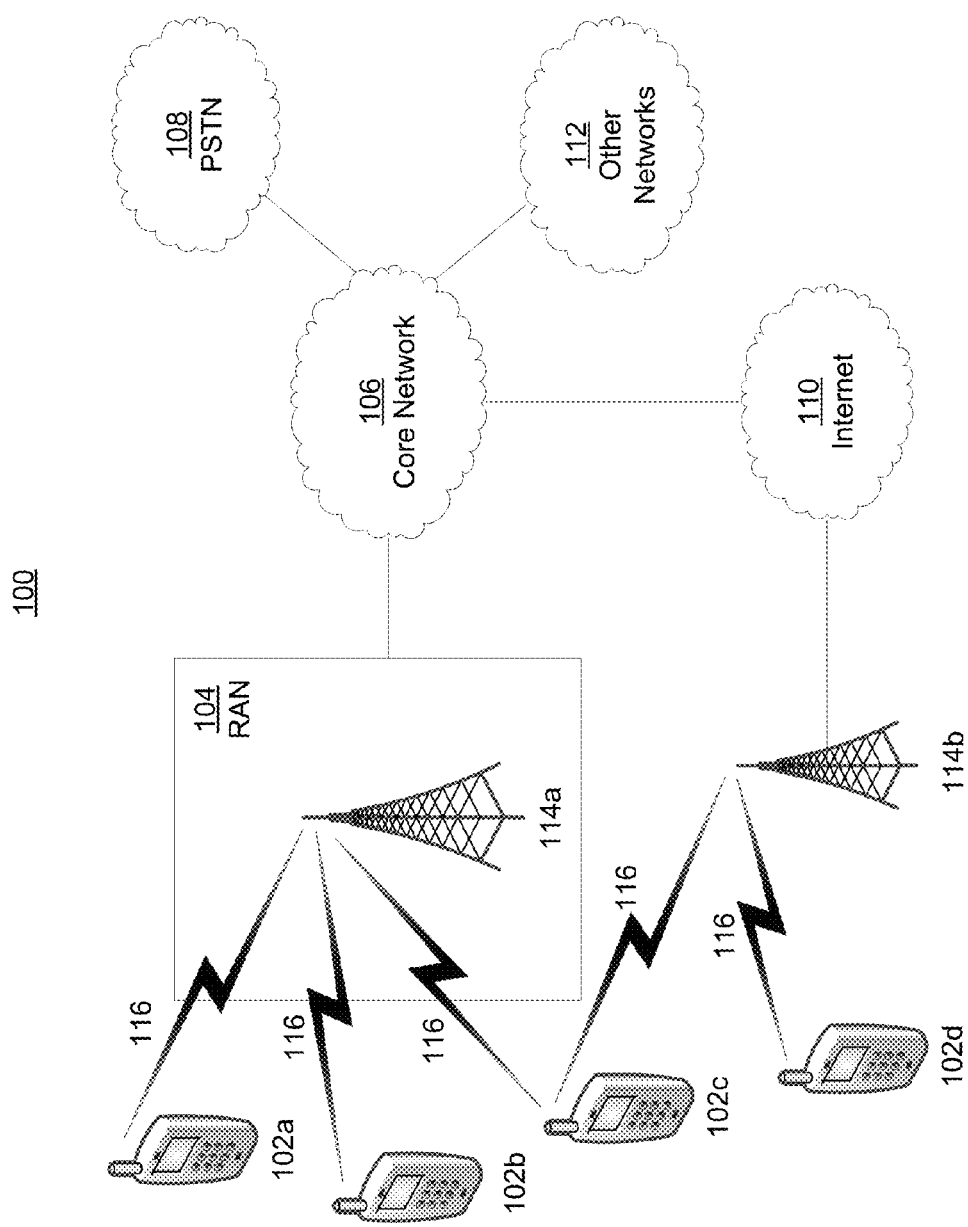
FIG. 1A is a system diagram of an example communications system in which methods and systems for indoor location tracking may be implemented.

FIG. 1A is a diagram of an example communications system 100 in which methods and systems for indoor location tracking as disclosed herein may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
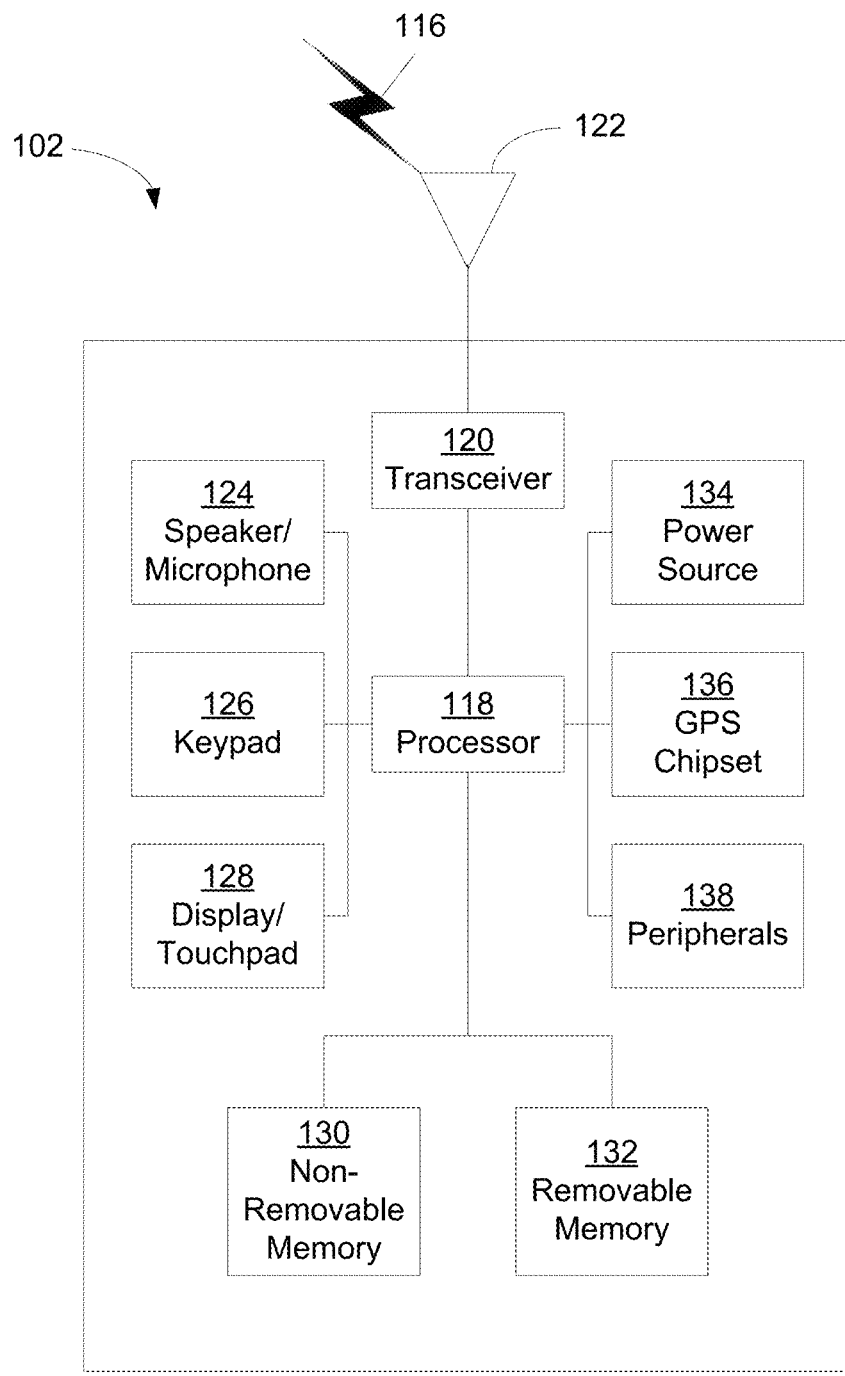
FIG. 1B is a system diagram of an example mobile device (may also be referred to herein as a wireless transmit/receive unit (WTRU) and as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
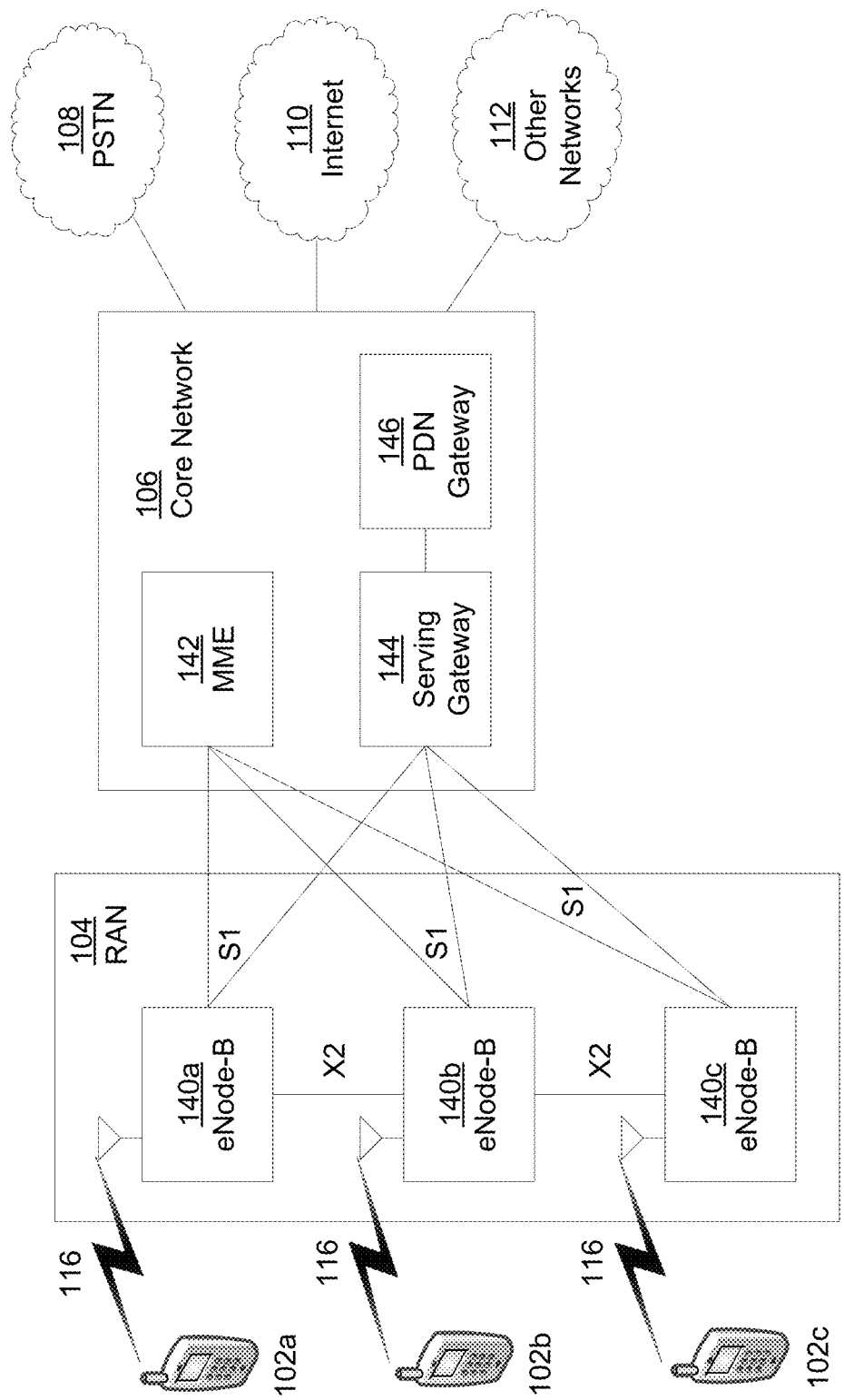
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, and 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
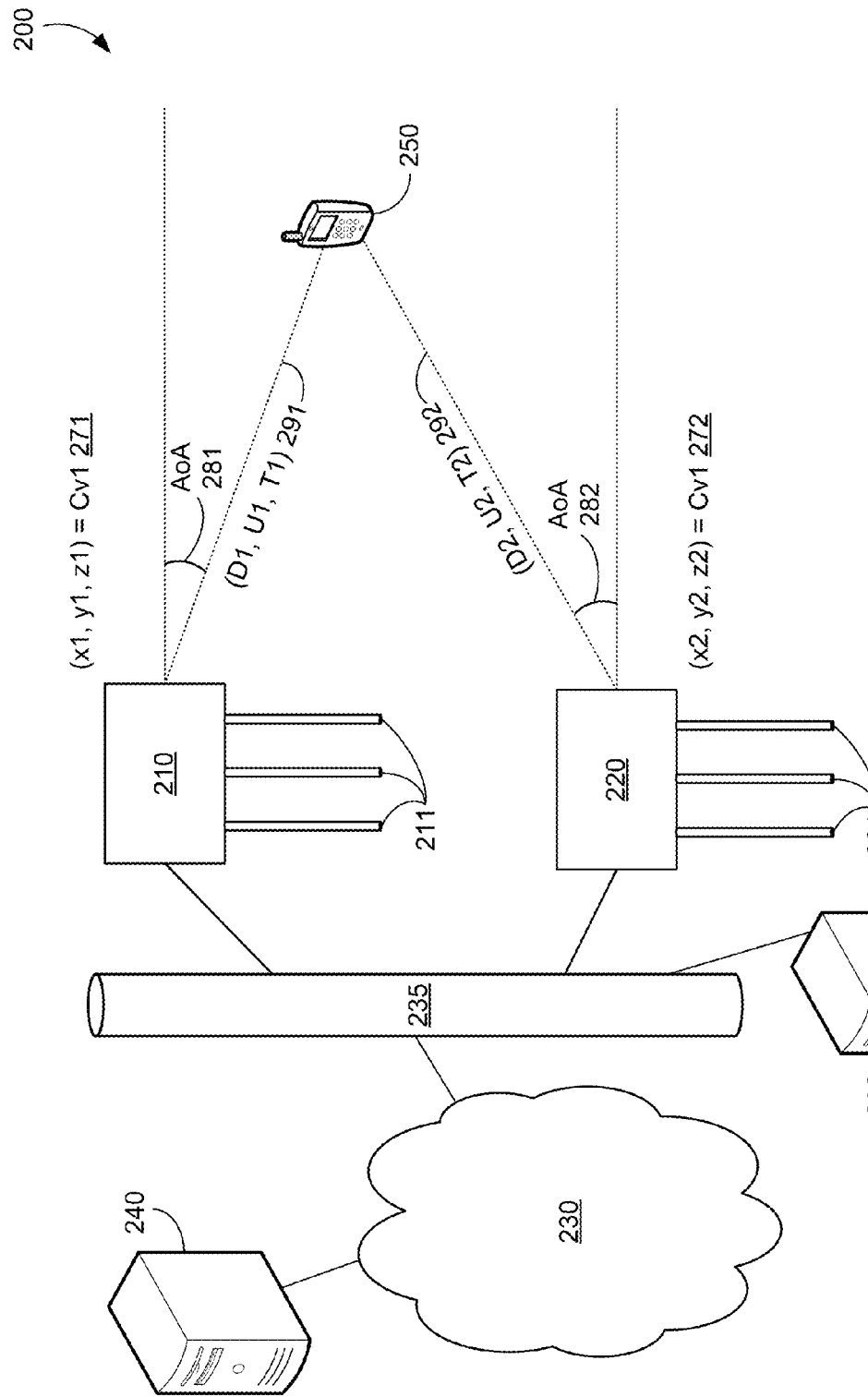
FIG. 2 illustrates a non-limiting exemplary system in which methods and systems for indoor location tracking may be implemented.

FIG. 2 illustrates exemplary non-limiting system 200 in which embodiments may be implemented. Radio frequency (RF) signal mediator 210 may be installed in an indoor area (e.g., mall, indoor stadium, store, etc.). RF signal mediator 210 may collect and mediate RF measurements from UEs such as UE 250. In some embodiments, this may be accomplished by using existing UE handover mechanisms and other layer 2 RAN calculations. For example, the RF measurements performed by RF signal mediator 210 may include received signal strength indicator (RSSI) that indicates the signal strength received on a receiver antenna of RF signal mediator 210 within the bandwidth of the antenna. The RF measurements may further include reference signal received power (RSRP) that is used in handover procedures. The RF measurements may further include reference signal received quality (RSRQ) that may also be used in handover procedures. The RF measurements may further include timing advance that represents the duration that a signal takes to propagate from a UE to a base station. The RF measurements may also include reference signal time difference (RSTD) which may indicate the relative timing difference between cells as measured and reported by a UE. Another RF measurement that may be used is angle of arrival (AoA), which indicates the angle of arrival of a UE's signal at RF signal mediator 210. RF signal mediator 210 may be equipped with an antenna array that allows RF signal mediator 210 to determine AoA. Note that RF signal mediator 220 may also perform the same or similar measurements.

Each of RF signal mediators 210 and 220 may include an array of antennas (e.g., four antennas, eight antennas) that enable each RF signal mediator to determine AoA information for received UE signals. These antennas may be passive and not configured to transmit. In an embodiment, the measurements of at least two RF signal mediators for one UE will be sufficient for calculating that UE's location, but any number and type of RF signal mediators may be used to implement the disclosed location tracking embodiments.

In some embodiments, RF signal mediator 210 may be a higher resolution signal mediator while RF signal mediator 220 may have lower resolution capabilities. System 200 may be configured in this to lower overall total system cost as higher resolution mediators may be more expensive due to using higher cost hardware. For example, where RF signal mediator 210 is a higher resolution signal mediator, it may be configured with multiple antennas 211 configured with a single receiver. Antennas 211 may be directional antennas that may receive signals in multiple frequencies. RF signal mediator 210 may also be configured to handle multiple radio access technologies (e.g., LTE, WCDMA, GSM, CDMA2000, CDMA 1×, IS95, IEEE 802.11a/b/g/n, Bluetooth, etc.). Where RF signal mediator 220 is a lower resolution signal mediator, it may be configured with less capable hardware than that used in RF signal mediator 210. Firmware, software, hardware, or some combination thereof in both devices may decode UE permanent identifiers, (e.g., IMSI, IMEI, MAC address) and temporary identifiers (e.g., TMSI) detected in a signal received from UE 250. RF signal mediators 210 and 220 may also obtain or generate UE measurement reports (e.g., RSRP, RSRQ), a serving cell ID, a neighboring cell ID, handover requests, and power control transmissions from the signal received from UE 250.

Each of RF signal mediators 210 and 220 may be constructed for ease of installation and operation. For example, each of RF signal mediators 210 and 220 may be powered using power over Ethernet (PoE) technology. Each of RF signal mediators 210 and 220 may have a small form factor that enables the mediator to be hidden in decorations, collocated with security cameras, etc. RF signal mediators 210 and 220, and any other RF signal mediators configured in the area in which RF signal mediators 210 and 220 are configured, may be distributed across the physical space of the area or distributed using to in-door layout, where, in one embodiment, directional receivers may be deployed at the ends of corridors and pointing toward the corridors.

Measurements and other calculations and determinations may be made at one or both of RF signal mediators 210 and 220. For example, RF signal mediator 210 may serve as a centralized hub within system 200 for calculating UE locations. RF signal mediator 210 may receive, for example via local area network 235, signal data for UE 250 from one or more other RF signal mediators, such as RF signal mediator. RF signal mediator 210 may use this received data along with signal data RF signal mediator 210 has generated based on signals received at RF signal mediator 210 from UE 250 to determine a location for UE 250. RF signal mediator 210 may transmit this location data to location server 240 via local area network 235 and internet 230.

Alternatively, RF signal mediators 210 and 220 may communicate with local devices, providing those devices with signal data that can be used to determine a location for UE 250. RF signal mediators 210 and 220 may communicate with measurement server 236 via local area network 235. Measurement server 236 may collect signal data from RF signal mediators 210 and 220 and perform the disclosed measurements and calculations to determine a location for a UE, such as UE 250. Location data may be transmitted from measurement server 236 via local area network 235 and internet 230 to location server 240 that may be a location server operated by the service provider providing wireless communications services to UE 250. One skilled in the art will recognize that many other devices may be present in system 200, and other configurations may be implemented that use the disclosed embodiments. Note that measurement server 236 represents any number and type of computing devices that may be used in any embodiment disclosed herein. All such embodiments are contemplated as within the scope of the present disclosure.

Alternatively, location determination, measurements, and any other calculations may be performed at a remote device, such as location server 240 or another device operated by UE 250's service provider. In such an embodiment, RF signal mediators 210 and 220 may transmit signal data to location server 240 via local area network 235 and internet 230. In an alternative embodiment, signal data may be sent to measurement server 236, which may then transmit such data to location server 240 for location determination. Measurement server 236 may format, alter, or otherwise adjust or prepare signal data received from RF signal mediators 210 and 220 before transmitting such data to locations server 240. Note that measurement server 236 and location server 240 each represent any number and type of computing devices that may be used in any embodiment disclosed herein. All such embodiments are contemplated as within the scope of the present disclosure.

In an embodiment, a location for UE 250 may be determined using, at least in part, layer 2 RAN calculations that are commonly performed by base stations (e.g., eNode-Bs). Such calculations may be made by, for example, a designated RF signal mediator, a measurement server or cluster of measurement servers, a location server, or by any other device located proximate to, or remote from, RF signal mediators configured in an area. This device may be referred to herein as the "location determining device". In an embodiment, each of RF signal mediators 210 and 220 may detect, determine, and/or report to the location determining device (which may in some embodiments be one of RF signal mediators 210 and 220) an RSRP measurement for UE 250. RSRP may be a type of RSSI measurement that indicates the average power of a signal received from UE 250 over the resource elements that carry cell-specific reference signals within a certain frequency bandwidth. In another embodiment, or in addition, each of RF signal mediators 210 and 220 may detect, determine, and/or report to the location determining device (which may in some embodiments be one of RF signal mediators 210 and 220) an RSRQ measurement for UE 250. RSRQ may indicate the quality of the reference signal received from UE 250. Alternatively, or in addition, each of RF signal mediators 210 and 220 may detect, determine, and/or report to the location determining device (which may in some embodiments be one of RF signal mediators 210 and 220) timing advance or the detection of a Random Access Preamble from UE 250, from which RF signal mediators 210 and 220, or the location determining device may estimate the transmission timing of UE 250. Additionally, or instead, each of RF signal mediators 210 and 220 may detect, determine, and/or report to the location determining device (which may in some embodiments be one of RF signal mediators 210 and 220) RSTD data from UE 250.

Each of RF signal mediators 210 and 220 may also, or instead, detect, determine, and/or report to the location determining device (which may in some embodiments be one of RF signal mediators 210 and 220) AoA data 281 and 282, respectively, determined from signals received from UE 250. AoA may be a 2 element vector that may consist of horizontal and vertical angles and may be calculated by measuring UE 250's received signal strength from different antennas of RF signal mediators 210 and 220.

The data used by the location determining device may include Cv1 271, which may be a three-dimensional coordinate vector for RF signal mediator 210, and Cv2, which may be a three-dimensional coordinate vector for RF signal mediator 220. Data 291 may be determined and/or used, where D1 represents a determined distance between UE 250 and RF signal mediator 210, U1 represents an uncertainty of the distance D1, in some embodiments represented as a range of confidence, and T1 represents a radio signal time. D1 and U1 may be determined by the location determining device or by the reporting RF signal mediator 210 using RSRP, RSRO, RSSI, and/or timing advance data. Similarly, data 292 may be determined and/or used, where D2 represents a determined distance between UE 250 and RF signal mediator 220, U2 represents an uncertainty of the distance D2, in some embodiments represented as a range of confidence, and T2 represents a radio signal time. D2 and U2 may be determined by the location determining device or by the reporting RF signal mediator 220 using RSRP, RSRO, RSSI, and/or timing advance data. Note that RF signal mediators 210 and 220 may be highly synchronized in time and/or otherwise so that measurements can be used to determine a precise location for UE 250.

Other data may also be used by the location determining device to determine a precise location for UE 250. For example, signal measurements may be compared to measurement patterns generated by testing (e.g., drive testing and/or traffic training) to determine the "fingerprint" of the signal and thereby determine a location from which the signal originated, thus providing a location for UE 250. This and any other data may be used to determine a precise location for UE 250.

The location determining device may also take into account, and in some embodiments adjust a determined UE location based upon, physical environment from which UE signals are received. For example, the location determining device may be configured with the locations or areas within the space that are not accessible to users, such as shelving areas, fountains, greenery, etc. and adjust a determined location to ensure that it corresponds to an actual area where a user may be.

Using similar data about the space in which detected users may be present, the location determining device may supplement location data with specific landmark data. For example, the determined location of UE 250 may correspond to a particular checkout counter, a restroom, a specific area within a store, a bench, etc. This landmark information may be provided with location output that is sent to location server 240 to facilitate easier locating of the user of UE 250. Movement of UE 250 may also be taken into account as the user of UE 250 may be walking or otherwise moving within the space where the UE is detected. In such an embodiment, a movement rate and direction may be determined and an estimated location may be adjusted to account for movement for a period of time or may include an indication of the movement and direction. This may help, for example, emergency personnel more easily locate the user of UE 250.

The location determining device or location server 240 may determine an identity of a user of UE 250 using any means or methods. For example, typical UE identifying information, such as IMSI, IMEI, MAC address, and/or TMSI, may be used by the location determining device to determine the identity of the user of UE 150, or may be reported by the location determining device to location server 240 so that location server 240 may determine the identity of the user of UE 250. Alternatively, or in addition, identifying information such as a MAC address or IP address used by UE 250 may be detected and used to determine user identity. Any other means or methods may be used, by either a location determining device or location server 240, to determine UE 250's user's identity, and all such embodiments are contemplated herein.

Upon determining a location for UE 250 and any other data that the location determining device may determine, such data may be provided to location server 240 as a single report, or combined into a single report with data for other UEs detected in the space. Along with location data for one point in time, the location determining device may report a travel trace to location server 240 that provides a path of travel for UE 250 over a period of time. This may take the form of a listing of locations and corresponding times or any other form. Regardless of whether one location or several locations are reported for UE 250, a timestamp may be reported with each location reported.

Figure 3:
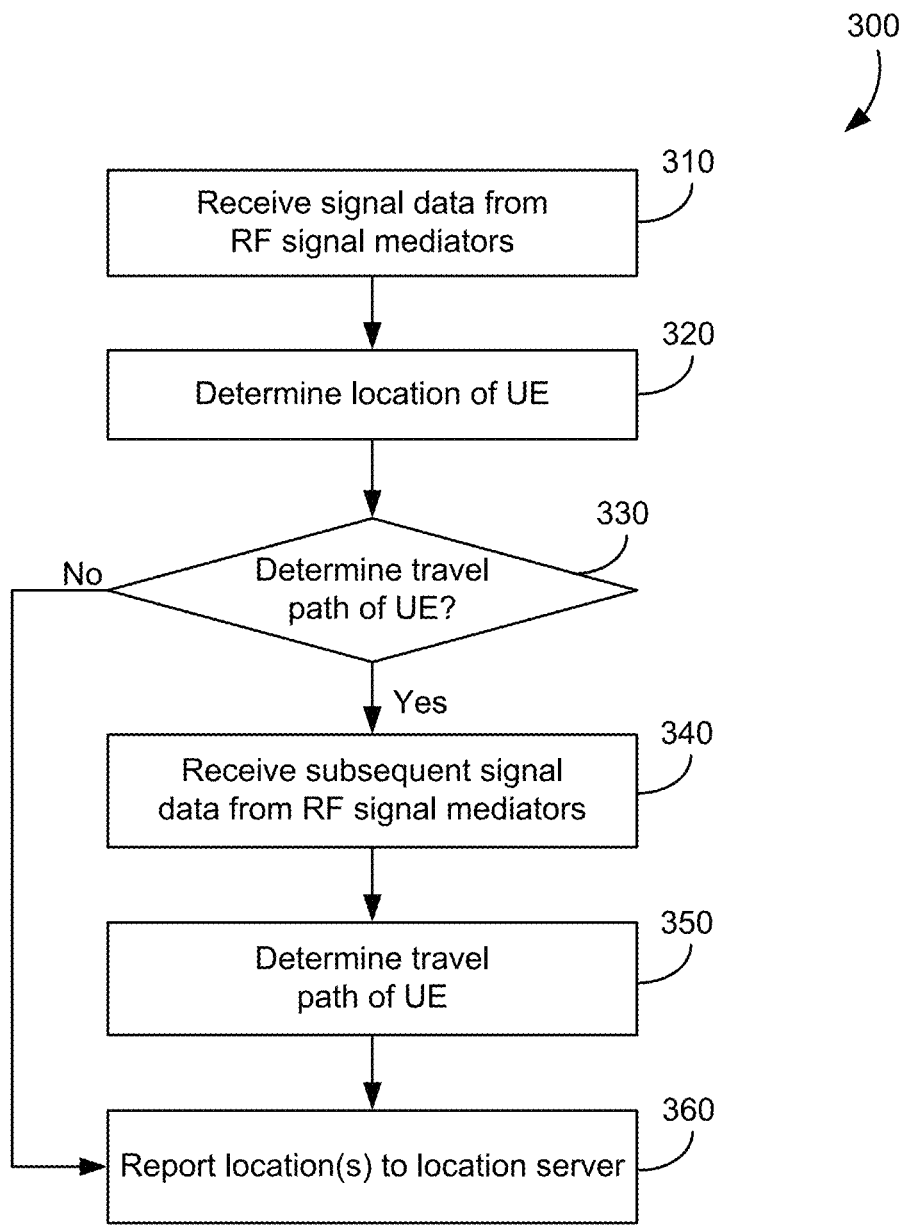
FIG. 3 illustrates a non-limiting exemplary method of implementing indoor location tracking.
Figure 4:
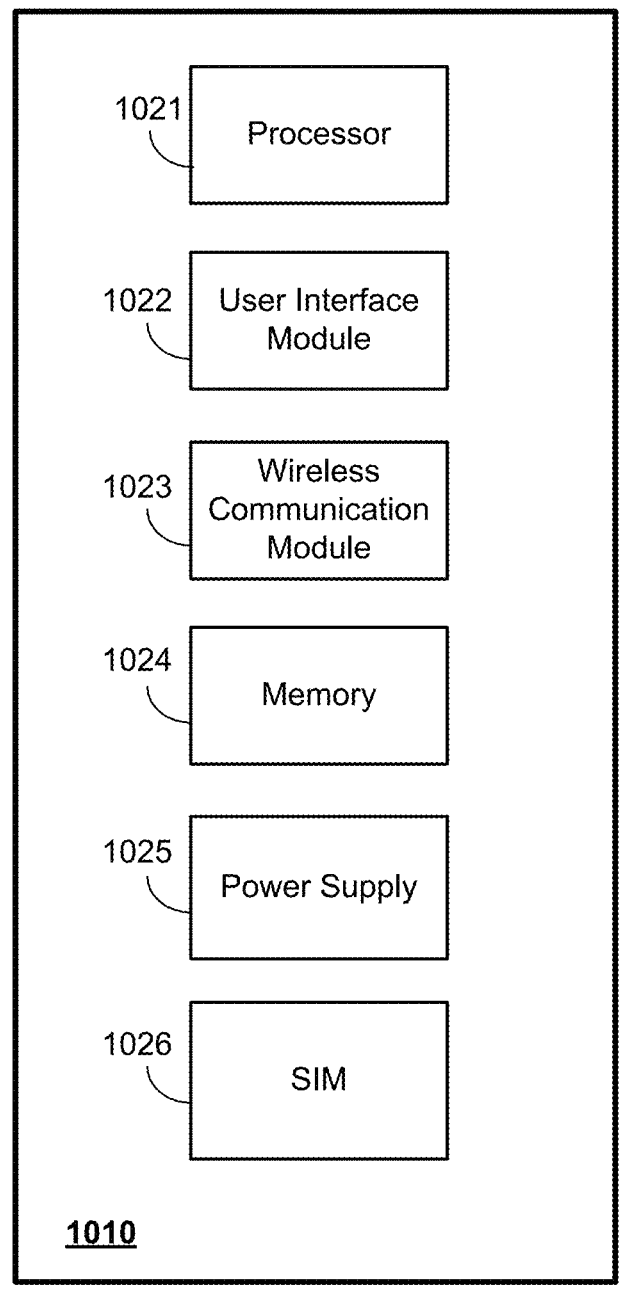
FIG. 4 is a block diagram of a non-limiting exemplary mobile device in which methods and systems for indoor location tracking may be implemented.

FIG. 3 illustrates exemplary, non-limiting method 300 of implementing an embodiment as disclosed herein. Method 300, and the individual actions and functions described in method 300 and the text associated therewith, may be performed by any one or more devices, including those described herein. In an embodiment, method 300 may be performed by a device such as measurement server 236, locations server 240, an RF signal mediator, or by any other device or component, in some embodiments in conjunction with other device and/or software configured and/or executing on any other device. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 310, signal data may be received from RF signal mediators as described herein. Such data may simply be raw signal data as received by the RF signal mediators and forwarded to the receiving device at block 310, data that has been processed and that is based on signals received from by the RF signal mediators, or any combination thereof. At block 320, using the data received at block 310, in some embodiments in combination with other data (e.g., area specific data, landmark data, etc.), a location may be determined for a specific UE.

At block 330, a determination may be made as to whether a path of travel (i.e., travel trace) is to be determined for a UE, or some other data that represents multiple locations over time for a UE. If so, at block 340, additional data may be received from RF signal mediators for the UE, and at block 350, additional locations may be determined based on the additional data, and, in an embodiment, a path of travel may be determined. This may be simply a listing of locations and associated times or some other form of providing multiple location data for a single UE. Once the path of travel is determined, or if no path of travel is to be determined, at block 360, the single or multiple locations over time for the UE may be provided to a location server. This location data for the UE may be combined with other data for other UEs and any other data in a single transmission. Alternatively, each location report for each UE may be transmitted individually.

The methods and systems for indoor location tracking described herein may provide a means for emergency responders to more quickly and precisely determine a user's location so that they may render aid to the user. Such data may also be used by vendors, manufacturers, retailers, etc., to determine demographics of particular users that may be in particular locations. For example, the ages, occupations, marital status, ethnicity, etc., of users at a particular location of significance to a retailer, such as a particular product display, may be used to determine the types of people that are most interested in a particular product. Travel trace data may further supplement this to illustrate how long particular types of users remain at a display, thus providing a gauge of such user's interest in the product in the display. Such users, once identified, may be sent targeted advertising (email, text, message, visual voicemail, etc.) specific to the product or display that may be more effective than typical advertising methods because the users have been clearly identified as having some interest in the product.

Note that the present subject matter may also be applied in an outdoor area to collect information and assist in location determining, perhaps in a more precise fashion that that provided for by using only GPS. By implementing the present disclosure, the user experience may be improved by providing faster emergency response and more targeted advertising, etc. Set forth below are further exemplary systems, devices, and components in which aspects of the disclosed methods and systems for indoor location tracking may be implemented.

Figure 5:
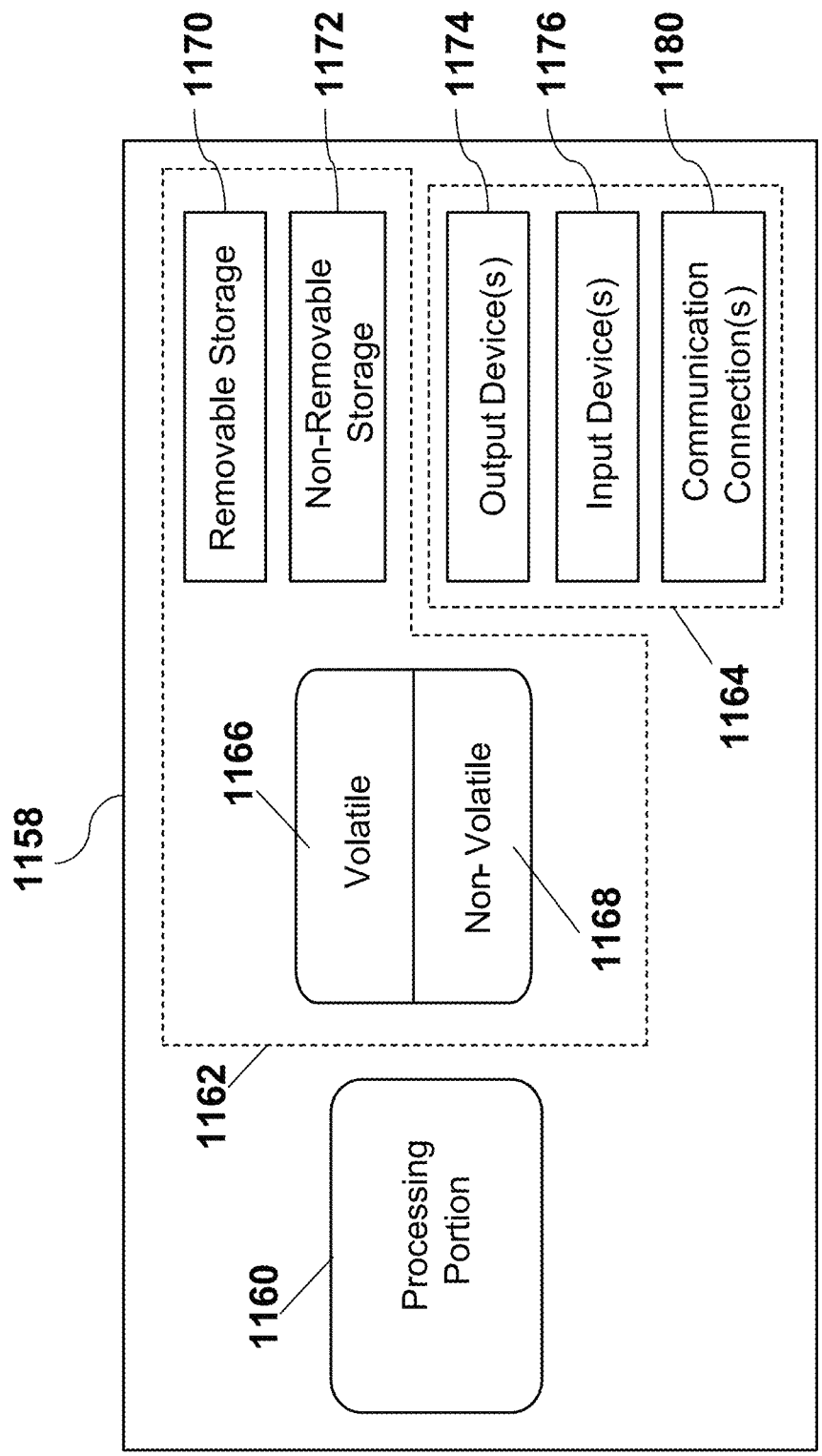
FIG. 5 is a block diagram of a non-limiting exemplary processor in which methods and systems for indoor location tracking may be implemented.

FIG. 5 illustrates an example wireless device 1010 that may be used in connection with an embodiment. References will also be made to other figures of the present disclosure as appropriate. For example, mobile devices 102 and 250 may be wireless devices of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to methods and systems for indoor location tracking, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
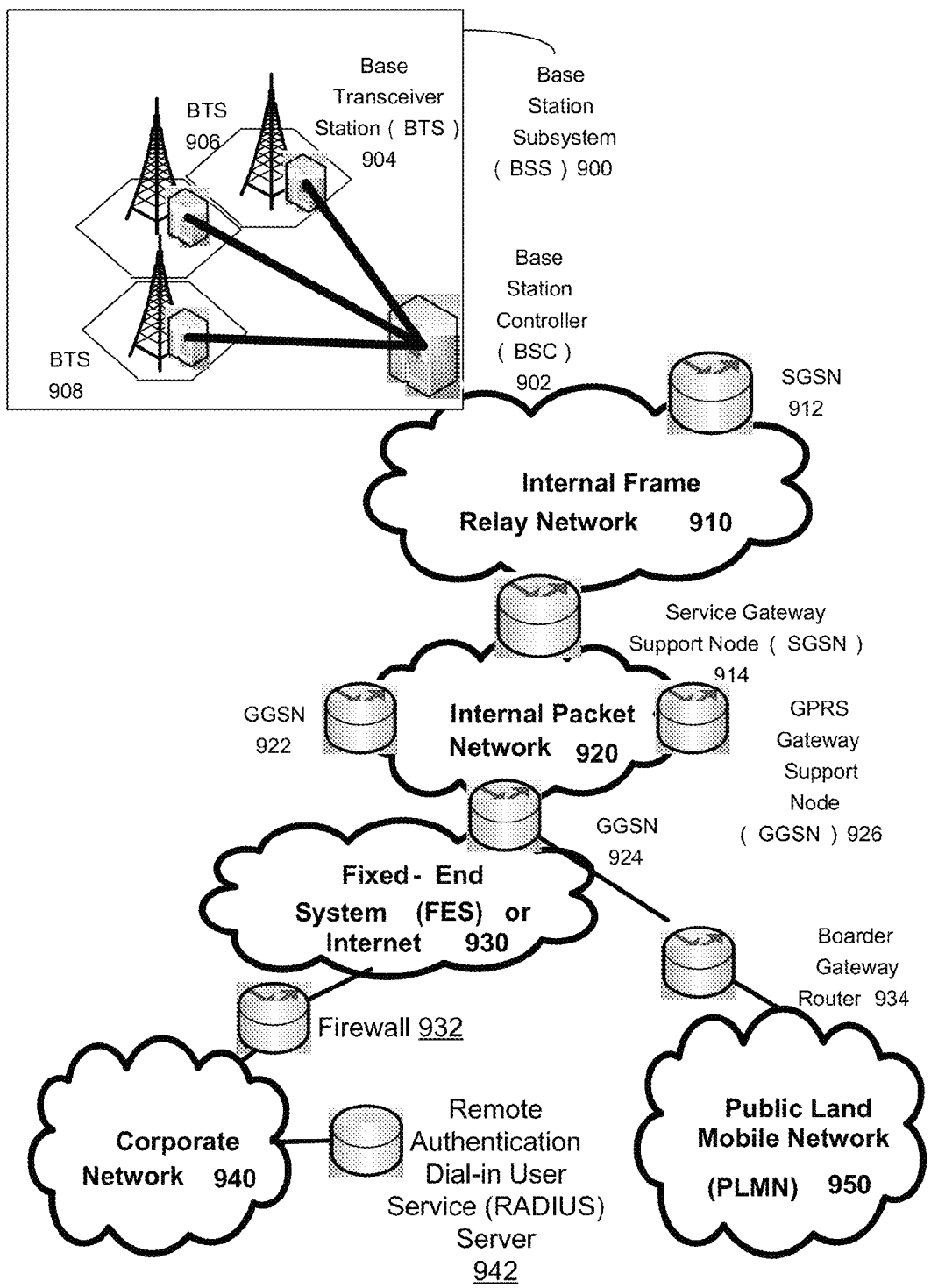
FIG. 6 is a block diagram of a non-limiting exemplary packet-based mobile cellular network environment, such as a GPRS network, in which methods and systems for indoor location tracking may be implemented.

FIG. 6 is a block diagram of an example processor 1158 which may be employed in any of the embodiments described herein, including as one or more components of mobile device 250, location server 240, measurement server 236, as one or more components of network equipment such as eNode-B 140, MME 142, serving gateway 144, PDN gateway 146, RF signal mediators 210 and 220, any other component of networks 106, 108, 110, 112, 235, and 230, and/or any related equipment, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing condition and event data, RAN component selection criteria, configuration commands, profiles, thresholds, APNs, MNCs, MCCs, service requests, radio resource requests, QoS and/or APN parameters, software for traffic management and event planning, device and link status, condition, and congestion data, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, tangible computer-readable storage media such as magnetic disks, optical disks, tapes, flash memory, smart cards, and/or any combination thereof. Computer-readable storage media, such as memory and storage elements 1162, 1170, 1172, 1166, and 1168, may be tangible storage media that may be volatile or nonvolatile, removable or non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other tangible medium that may be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however; and thus the below-described network architectures merely show how methods and systems for indoor location tracking may be implemented with stationary and non-stationary network structures and architectures. It will be appreciated, however, that methods and systems for indoor location tracking as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, methods and systems for indoor location tracking may be implemented independently of the method of data transport and does not depend on any particular network architecture or underlying protocols.

Figure 7:
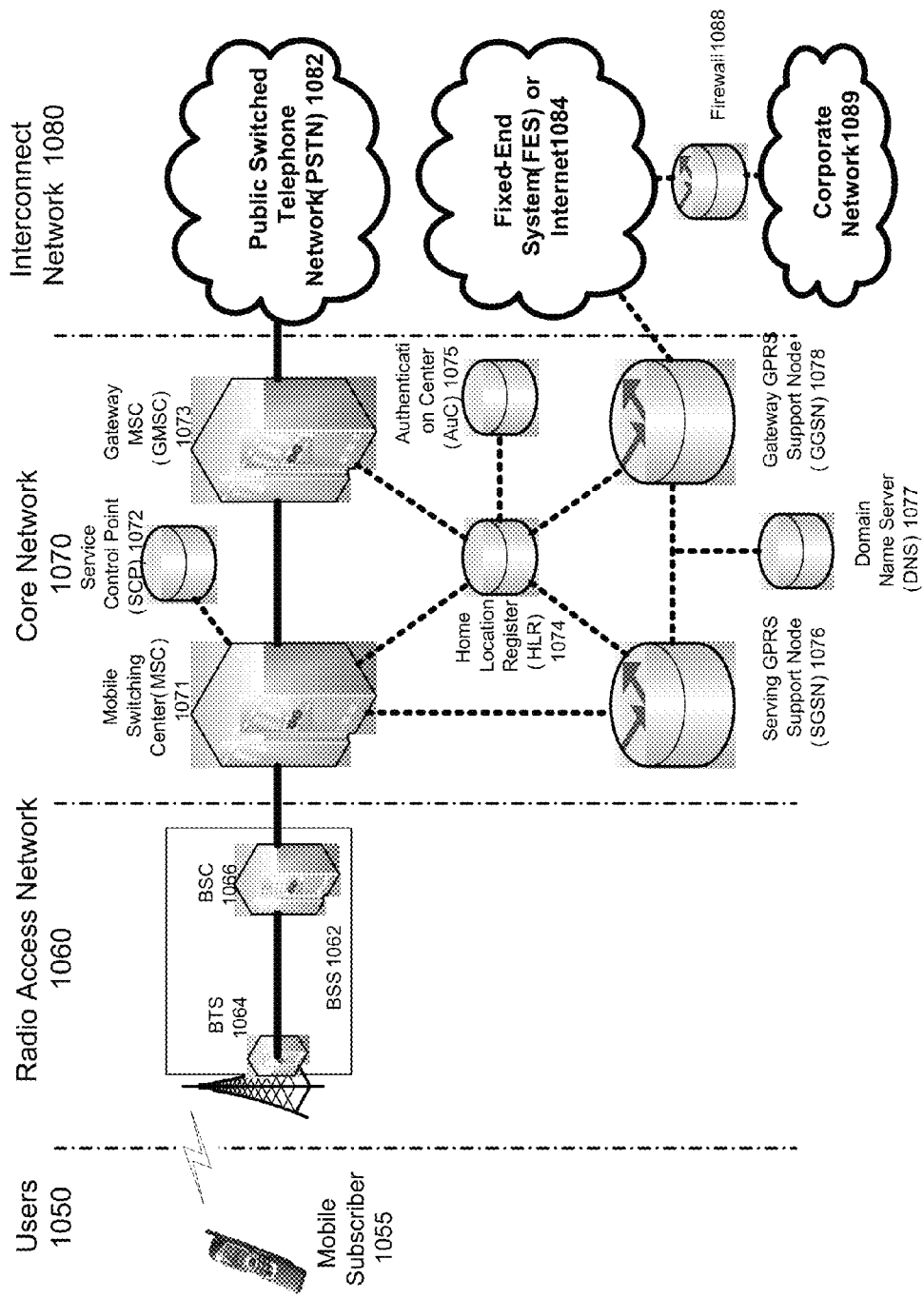
FIG. 7 illustrates a non-limiting exemplary architecture of a typical GPRS network, segmented into four groups, in which methods and systems for indoor location tracking may be implemented.

FIG. 7 depicts an overall block diagram of an exemplary packet-based mobile cellular network environment, such as a GPRS network, in which methods and systems for indoor location tracking such as those described herein may be practiced. In an example configuration, any RAN component as described herein may be encompassed by or interact with the network environment depicted in FIG. 7. Similarly, mobile devices 102, 220, and 320 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102, 220, and 320) become connected to the wireless network. In exemplary fashion, the packet traffic originating from user devices (e.g., mobile devices 102, 220, and 320) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
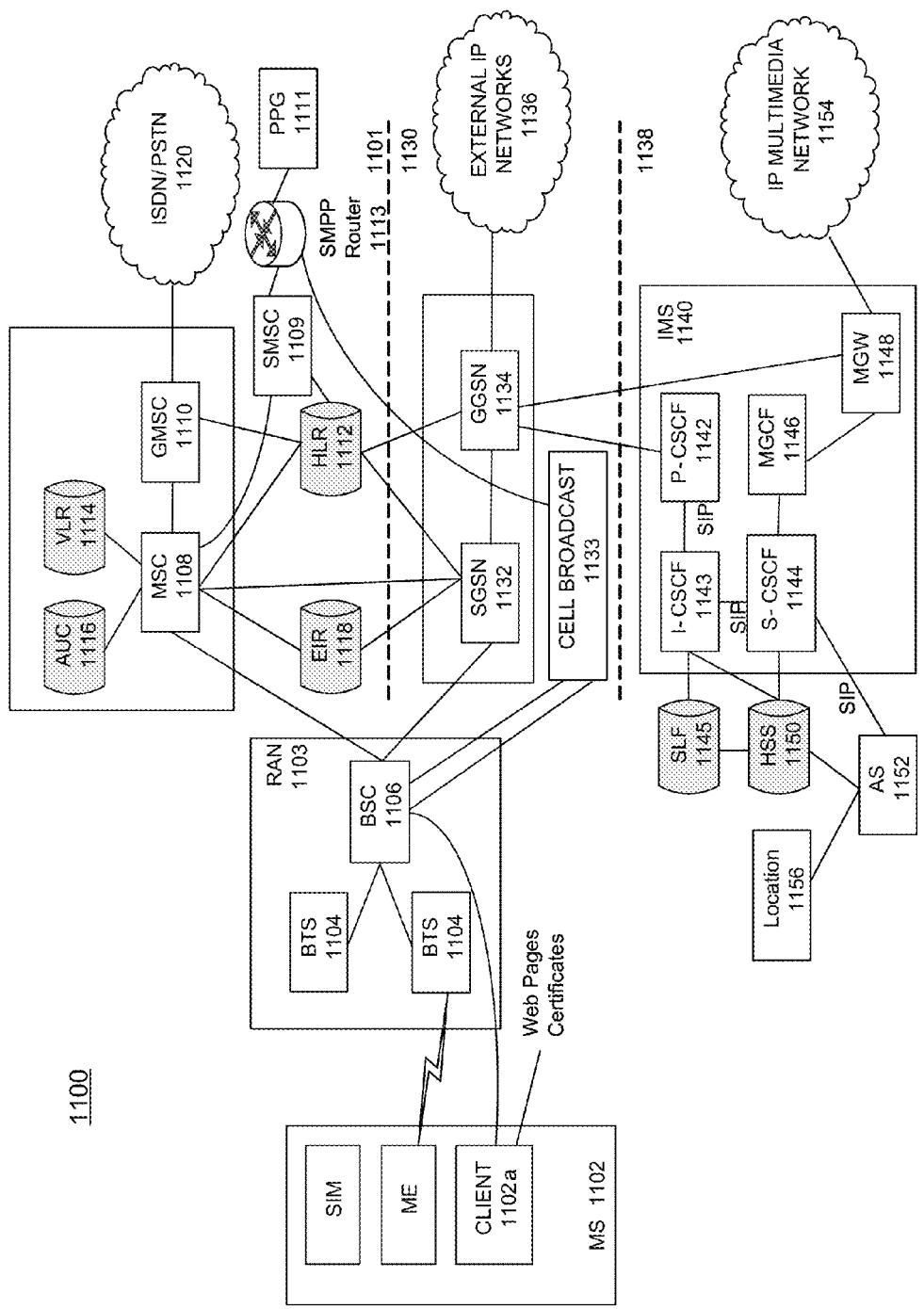
FIG. 8 illustrates a non-limiting alternate block diagram of an exemplary GSM/GPRS/IP multimedia network architecture in which methods and systems for indoor location tracking may be implemented.

FIG. 8 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 8). In an example embodiment, the device depicted as mobile subscriber 1055 may comprise any of mobile devices 102, 220, and 320. Radio access network 1060 comprises a plurality of base station subsystems such as BSSs 1062, which may include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102, 220, and 320, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of methods and systems for indoor location tracking such as those described herein may include, but are not limited to, any RAN component, Gateway GPRS Support Node tables, Fixed End System router tables, firewall systems, VPN tunnels, and any number of other network elements as required by the particular digital network.

Figure 9:
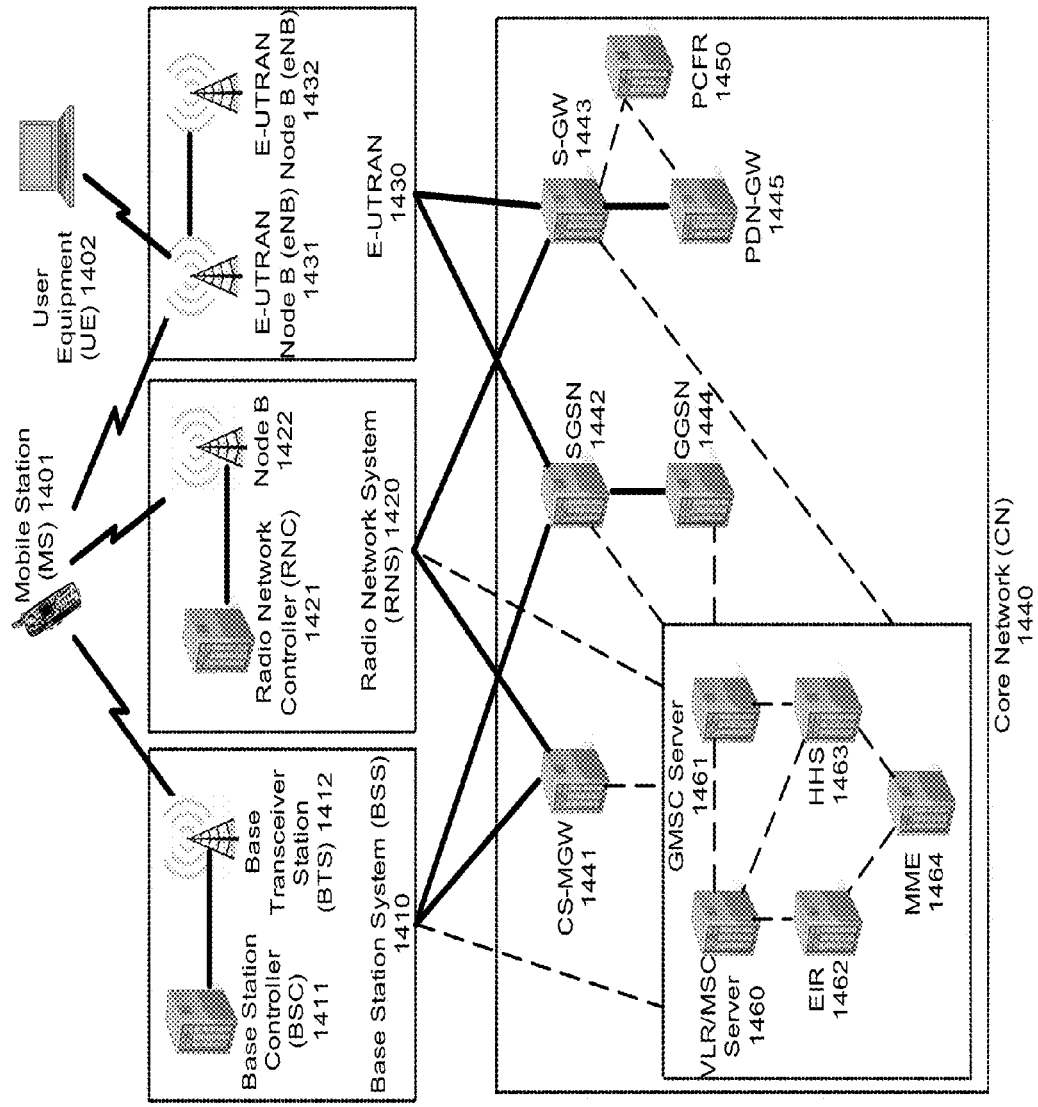
FIG. 9 illustrates a PLMN block diagram view of an example architecture in which methods and systems for indoor location tracking may be incorporated.

FIG. 9 illustrates another exemplary block diagram view of a GSM/GPRS/IP multimedia network architecture 1100 in which methods and systems for indoor location tracking such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 may be physical equipment or Mobile Equipment (ME), such as a mobile telephone or a laptop computer (e.g., mobile devices 102, 220, and 320) that may be used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

FIG. 10 illustrates a PLMN block diagram view of an example architecture in which methods and systems for indoor location tracking may be incorporated. Mobile Station (MS) 1401 is the physical equipment used by the PLMN subscriber. In one illustrative embodiment, any of mobile devices 102, 220, and 320 may serve as Mobile Station 1401. Mobile Station 1401 may be one of, but not limited to, a cellular telephone, a cellular telephone in combination with another electronic device, or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 may be responsible for communicating with Mobile Station 1401 in its geographically defined area. RNC 1421 may be responsible for controlling the Node(s) B 1422 that are connected to it and is a control element in a UMTS radio access network. RNC 1421 may perform functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNode B, may also be referred to as an "eNB") 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 10 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In an illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 may include, but are not limited to, media conversion, bearer control, payload processing and other mobile network processing such as handover or anchoring. CS-MGW 1441 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 may include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information and may store subscription data regarding Mobile Station 1401 or User Equipment 1402 for handling calls or data sessions. Networks may contain one HSS 1463 or more if additional resources are required. Example data stored by HSS 1463 may include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of methods and systems for indoor location tracking have been described in connection with various computing devices/processors, the underlying concepts may be applied to any computing device, processor, or system capable of implementing indoor location tracking. The various techniques described herein may be implemented in connection with hardware or software or, where appropriate, with a combination of both. Thus, the methods and systems for indoor location tracking may be implemented, or certain aspects or portions thereof, may take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is neither a transient nor a propagating signal per se. When the program code is loaded into and executed by a machine, such as a computer, the machine becomes an apparatus for implementing indoor location tracking. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

While methods and systems for indoor location tracking have been described in connection with the various embodiments of the various figures, it is to be understood that other similar embodiments may be used or modifications and additions may be made to the described embodiments for performing the same function of indoor location tracking without deviating therefrom. For example, one skilled in the art will recognize that indoor location tracking as described in the present application may apply to any environment, whether wired or wireless, and may be applied to any number of such devices connected via a communications network and interacting across the network. Therefore, systems and methods for indoor location tracking should not be limited to any single embodiment, but rather should be construed in breadth and scope in accordance with the appended claims.

What is claimed is:

1. A method for locating a mobile device performed by a first radio frequency signal mediator having an array of antennas, the method comprising:
   receiving, at the first radio frequency signal mediator that serves as a centralized hub, a radio frequency signal from the mobile device;
   determining, at the first radio frequency signal mediator a first layer two radio access network measurement data from the radio frequency signal;
   receiving, at the first radio frequency signal mediator second layer two radio access network measurement data of from a second radio frequency signal mediator;
   determining, at the first radio frequency signal mediator, a location for the mobile device based on the first layer two radio access network measurement data and the second layer two radio access network measurement data; and
   providing the location for the mobile device to a location server.

2. The method of claim 1, wherein the first layer two radio access network measurement data comprises a first received signal strength indicator measurement, and wherein the second layer two radio access network measurement data comprises a second received signal strength indicator measurement.

3. The method of claim 1, wherein the first layer two radio access network measurement data comprises a first reference signal received power measurement, and wherein the second layer two radio access network measurement data comprises a second reference signal received power measurement.

4. The method of claim 1, wherein the first layer two radio access network measurement data comprises first reference signal received quality measurement, and wherein the second layer two radio access network measurement data comprises second reference signal received quality measurement.

5. The method of claim 1, wherein the first layer two radio access network measurement data comprises a first timing advance measurement, and wherein the second layer two radio access network measurement data comprises a second timing advance measurement.

6. The method of claim 1, wherein the first layer two radio access network measurement data comprises a first reference signal time difference measurement, and wherein the second layer two radio access network measurement data comprises a second reference signal time difference measurement.

7. The method of claim 1, wherein the first layer two radio access network measurement data comprises a first angle of arrival measurement, and wherein the second layer two radio access network measurement data comprises a second angle of arrival measurement.

8. A location determination system comprising:
a memory comprising executable instructions; and
a first radio frequency signal mediator having a processor and an array of antennas, wherein the processor, when executing the executable instructions, effectuates operations comprising:
receiving, at the first radio frequency signal mediator, a radio frequency signal from a mobile device;
measuring, at the first radio frequency signal mediator a first measurement of the radio frequency signal;
receiving, from a second radio frequency signal mediator, a second measurement of the radio frequency signal measured by a second radio frequency signal mediator;
determining, based on the first measurement and the second measurement, a location for the mobile device; and
transmitting the location for the mobile device to a location server.

9. The location determination system of claim 8, wherein the first measurement comprises a first received signal strength indicator measurement, and wherein the second measurement comprises a second received signal strength indicator measurement.

10. The location determination system of claim 8, wherein the first measurement comprises a first reference signal received power measurement, and wherein the second measurement comprises second reference signal received power measurement.

11. The location determination system of claim 8, wherein the first measurement comprises first reference signal received quality measurement, and wherein the second measurement comprises second reference signal received quality measurement.

12. The location determination system of claim 8, wherein the first measurement comprises a first timing advance measurement, and wherein the second measurement comprises a second timing advance measurement.

13. The location determination system of claim 8, wherein the first measurement comprises a first reference signal time difference measurement, and wherein the second measurement comprises a second reference signal time difference measurement.

14. The location determination system of claim 8, wherein the first measurement comprises a first angle of arrival measurement, and wherein the second measurement comprises a second angle of arrival measurement.

15. A computer-readable storage medium comprising computer-executable instructions, which when executed by a processor, cause the processor to effectuate operations comprising:
receiving, at a first radio frequency signal mediator having an array of antennas, a radio frequency signal from a mobile device;
measuring, at the first radio frequency signal mediator a first measurement of the radio frequency signal;
receiving, at the first radio frequency signal mediator a second measurement of the radio frequency signal measured by a second radio frequency signal mediator;
determining, at the first radio frequency signal mediator a location for the mobile device based on the first measure and the second measure; and
transmitting the location for the mobile device to a location server.

16. The computer-readable storage medium of claim 15, wherein the first measurement comprises a first received signal strength indicator measurement, and wherein the second measurement comprises a second received signal strength indicator measurement.

17. The computer-readable storage medium of claim 15, wherein the first measurement comprises a first reference signal received power measurement, and wherein the second measurement comprises a second reference signal received power measurement.

18. The computer-readable storage medium of claim 15, wherein the first measurement comprises a first reference signal received quality measurement, and wherein the second signal measurement comprises a second reference signal received quality measurement.

19. The computer-readable storage medium of claim 15, wherein the first measurement comprises a first timing advance measurement, and wherein the second measurement comprises a second timing advance data measurement.

20. The computer-readable storage medium of claim 15, wherein the first measurement comprises a first reference signal time difference measurement, and wherein the second measurement comprises a second reference signal time difference measurement.

\* \* \* \* \*